United States Patent
Barrepski

(12) 
(10) Patent No.: US 6,997,426 B1
(45) Date of Patent: Feb. 14, 2006

(54) GROUNDED HOLDING DEVICE AND METHOD OF USE

(76) Inventor: Christopher R. Barrepski, 9 Edgewood Rd., Ellington, CT (US) 06029

(*) Notice: Subject to any disclaimer, the term of this patent is extended or adjusted under 35 U.S.C. 154(b) by 0 days.

(21) Appl. No.: 10/794,046

(22) Filed: Mar. 8, 2004

Related U.S. Application Data

(60) Provisional application No. 60/482,240, filed on Jun. 26, 2003.

(51) Int. Cl.
*F16M 1/00* (2006.01)

(52) U.S. Cl. ..................................... 248/678
(58) Field of Classification Search ............... 248/678, 248/676; 52/696, 655.1, 697, 712, 715
See application file for complete search history.

(56) References Cited

U.S. PATENT DOCUMENTS

| | | | |
|---|---|---|---|
| 1,001,355 A * | 8/1911 | Chipley | 238/89 |
| 1,455,712 A * | 5/1923 | Collins | 52/696 |
| 1,575,931 A * | 3/1926 | Orlopp | 52/715 |
| 2,790,184 A | 4/1957 | Testa | |
| 2,964,807 A * | 12/1960 | Kennedy | 52/696 |
| 3,461,636 A * | 8/1969 | Hern | 52/650.1 |
| 4,061,092 A | 12/1977 | Jacobsen et al. | |
| 4,305,508 A * | 12/1981 | Rodgers | 211/85.8 |
| 4,366,774 A | 1/1983 | Haake et al. | |
| D270,974 S | 10/1983 | Kneale, III | |
| 4,424,908 A | 1/1984 | Davitz | |
| 5,082,233 A * | 1/1992 | Ayers et al. | 248/553 |
| 5,127,619 A | 7/1992 | Bleim | |
| 5,127,620 A | 7/1992 | Bleim et al. | |
| 5,425,314 A * | 6/1995 | MacFarland | 108/51.3 |
| 5,606,837 A * | 3/1997 | Holizlander | 52/693 |
| 6,145,678 A | 11/2000 | Morrison | |
| 6,186,468 B1 * | 2/2001 | Schlegel | 248/678 |
| 6,212,705 B1 | 4/2001 | Kramer | |
| 6,286,691 B1 | 9/2001 | Oberhaus et al. | |
| 6,332,299 B1 * | 12/2001 | Stewart, III | 52/696 |
| 6,435,105 B1 | 8/2002 | Mikich et al. | |
| 6,515,224 B1 | 2/2003 | Pedro | |
| 6,857,240 B1 * | 2/2005 | MacAlister | 52/564 |
| 2002/0063102 A1 | 5/2002 | Hanneken | |
| 2003/0047658 A1 * | 3/2003 | Peter et al. | 248/346.01 |

* cited by examiner

*Primary Examiner*—Ramon O Ramirez
(74) *Attorney, Agent, or Firm*—Deborah A. Basile

(57) ABSTRACT

A support component comprising: a front portion; a back portion; a top surface joining the front and back portions; and a securing element, wherein the securing element comprises at least one horizontal tab, a first set of vertical tabs, or a combination comprising a horizontal tab and a set of vertical tabs, wherein: the horizontal tab(s) extends through a space formed between the front and back portions; and the first set of vertical tabs comprises a first vertical tab disposed on the front portion and in direct alignment with a second vertical tab disposed on the back portion; wherein the horizontal tab(s) allows the support component to rest lengthwise on an anchoring surface, and the set of vertical tabs allow the support component to rest crosswise on an anchoring surface. Further disclosed herein are grounded holding devices comprising the support component(s) disclosed herein, and methods of use.

10 Claims, 4 Drawing Sheets

GROUNDED HOLDING DEVICE AND METHOD OF USE

CROSS REFERENCE TO RELATED APPLICATIONS

This application claims the benefit of U.S. Provisional Application No. 60/482,240 filed on Jun. 26, 2003.

BACKGROUND OF THE INVENTION

Installing heavy equipment, such as air conditioners, is currently time consuming and laborious requiring a wide number of parts. Little has been done to ease installation. Therefore, what is currently needed is a device to ease the installation process of heavy equipment, such as air conditioners, and to reduce the number of materials currently necessary for installation.

SUMMARY OF THE INVENTION

The above-discussed and other drawbacks and deficiencies of the prior art are overcome or alleviated by a support component comprising: a front portion; a back portion; a top surface joining at least a portion of the front and back portions; and a securing element, wherein the securing element comprises at least one horizontal tab, a first set of vertical tabs, or a combination comprising a horizontal tab and a set of vertical tabs, wherein: the horizontal tab(s) extends through a space formed between the front and back portions; and the first set of vertical tabs comprises a first vertical tab disposed on the front portion and in direct alignment with a second vertical tab disposed on the back portion; wherein the horizontal tab(s) allow the support component to rest lengthwise on an anchoring surface, and the set of vertical tabs allows the support component to rest crosswise on an anchoring surface. Further disclosed herein are grounded holding devices comprising the support component(s) disclosed herein, and methods of use.

DETAILED DESCRIPTION OF THE INVENTION

Figure 1:
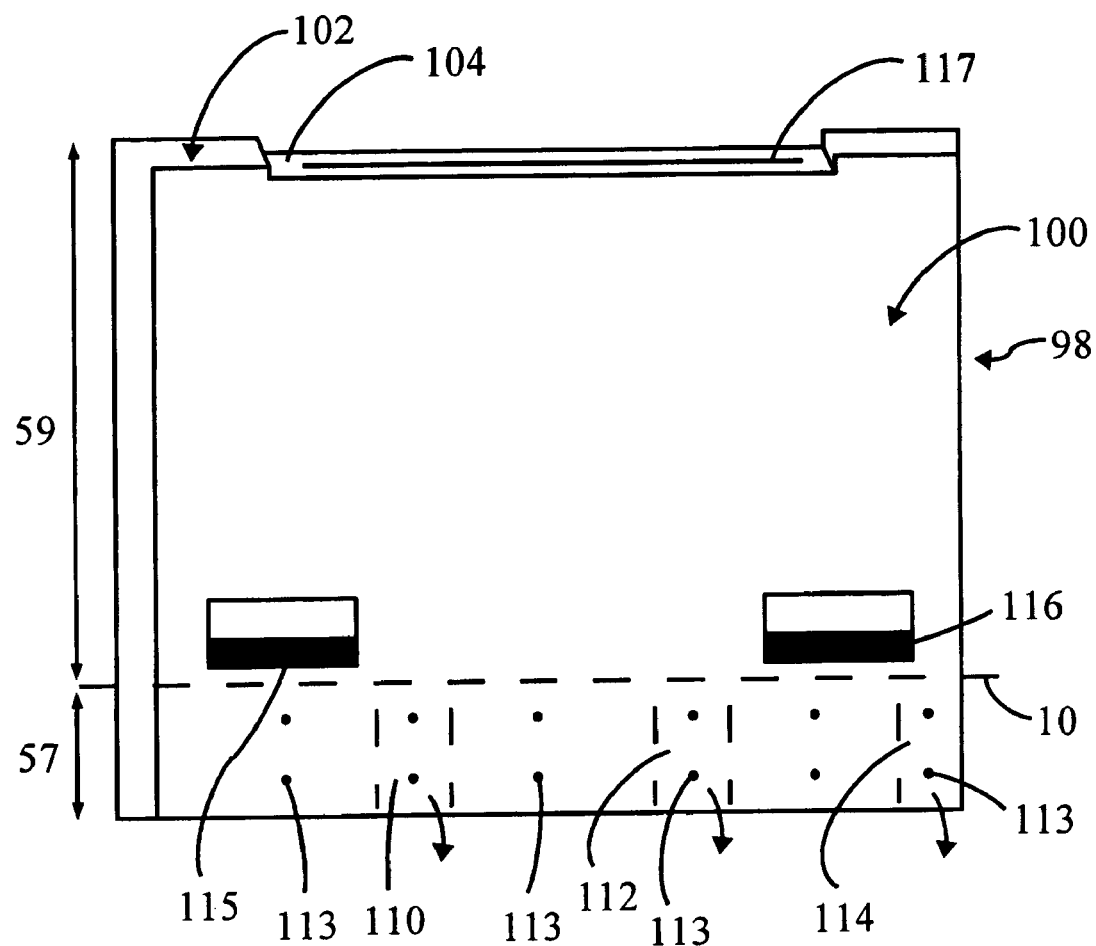
FIG. 1 is a schematic of an exemplary support component for a grounded holding device.

In general, disclosed herein is a grounded holding device. More particularly, disclosed herein is a grounded holding device for supporting a load, wherein the grounded holding device is well adapted for use on floor and ceiling beams and rafters, such as is typically found in attics, to hold loads capable of meeting capacity requirements, wherein an especially preferred load is an air conditioning unit.

In general, the grounded holding device comprises at least one, preferably, at least two, support components. The support component may comprise any material having sufficient rigidity and durability to support a desired load. Preferably, the support component comprises wood, metal, plastic, and the like. In a particularly preferred embodiment, the support component comprises 18 gauge galvanized sheet metal. The support component may comprise a wide variety of shapes, sizes, and geometrical configurations. However, in a preferred embodiment, the support component is specifically adapted to fit an anchoring surface, such as a beam or a rafter as is typically found in attic floorings and ceilings. Where the grounded holding device comprises more than one support component, the support components may comprise the same or different dimensions and/or configurations as the other support component(s).

In general, the support component comprises a front portion having a top side, a back portion having a top side, and a top surface which joins at least a portion of the top sides of the front and back portions. The support component further comprises a spatial gap between the front and back portions.

The support component further comprises a securing element, wherein the securing element facilitates the placement of the grounded holding device into a variety of positions. The securing element comprises at least one horizontal tab, at least one set of vertical tabs, or a combination comprising at least one of the foregoing. The horizontal tab preferably extends through the space created between the front and back portions and creates a bridge between the two portions. This bridge defines an upper limit by which the support component can be disposed lengthwise upon an anchoring surface. The set of vertical tabs preferably comprises at least one vertical tab located on the front portion of the support component and in direct alignment with a second vertical tab located on the back portion of the support component. Each of the vertical tabs comprises an upper limit by which the support component can be disposed crosswise upon an anchoring surface. Whether the securing element is positioned onto a rafter via the horizontal tab(s) or the set of vertical tab(s), the securing element may be set at the same height with respect to the rafter.

A load may be directly placed on the top surface of the support component(s); or, alternatively, a pan may be disposed on the top surface(s), and the load may then be placed either directly on the pan, or on a buffer element wherein the buffer element may be directly on the pan. The buffer element may be any material that can withstand the weight of the load, and which prevents direct contact between the load and the pan. A preferred buffer element is, for example, an adhesive block. Where the load comprises an air conditioning unit, the pan preferably comprises a condensate drain pan.

The grounded holding device may further comprise an adhesive disposed between the top surface of the support component(s) and the pan, or between the top surface of the support component(s) and the load to be supported, wherein the adhesive serves as a binding agent to provide greater stability to the load. Exemplary adhesives comprise high-density double sided sticky tape foam, construction adhesives, vibration mounting pads and devices, and the like.

The grounded holding device disclosed herein is well adapted for use in stabilizing a load onto an anchoring surface. Furthermore, the grounded holding device is adaptable such that it can fit on variously dimensioned anchoring surfaces. For example, a preferred anchoring surface comprises a rafter as is typically found in attic ceilings and roofs. The spacing between rafters may vary, wherein typical spacing is either about 16 inches or about 24 inches between rafters. The individual support component(s) forming the grounded holding device as disclosed herein can be configured to bridge the rafters regardless of the spacing between the rafters. Alternatively, the support component(s) forming the grounded holding device can be positioned lengthwise along a rafter, such as, for example, when the gap between rafters is too small or too large for the crosswise positioning of the support component, or due to other structural considerations.

FIGS. 1–4 depict exemplary embodiments of grounded holding devices, and components thereof, specifically adapted for use on an anchoring surface. Although the exemplary embodiments are made in reference to FIGS. 1–4, these figures are in no way limiting, and slight variations and modifications to these figures are contemplated.

FIG. 1 depicts an exemplary support component for use in a grounded holding device secured to an anchoring surface. Referring to FIG. 1, a support component 98 comprises a longitudinal axis 10. Support component 98 further comprises a front portion 100 and a back portion 102, wherein a portion of the top edges of front and back portions 100, 102 are joined by a top surface 104. Top surface 104 comprises an adhesive 117, or any other alternative material(s) and/or device(s) that will reduce or eliminate vibration resulting from placement of the load onto support component 98. Adhesive 117 may be used to secure a pan (not shown) or a load (not shown) to support component 98. Additionally, rather than a continuous strip, adhesive 117 may comprise a discontinuous strip or it may be positioned and dimensioned in a wide variety of manners so long as it is capable of further securing a pan or a load to the support component.

Support component 98 may comprise a plurality of vias 113 disposed on both front portion 100 and back portion 102. The plurality of vias 113 serve to further secure support component 98 onto an anchoring surface.

Horizontal tabs 115, 116 extend through a space formed between front and back portions 100, 102 and form a bridge between front and back portions 100, 102. The bridges or upper limits created by horizontal tabs 115, 116 serve as a means by which support component 98 may be supported onto an anchoring surface such that the longitudinal axis 10 of support component 98 is parallel to the anchoring surface (i.e., the support component can be placed lengthwise onto the anchoring surface (See FIG. 3)).

Although FIG. 1 depicts two horizontal tabs, the support component may comprise any number of horizontal tabs sufficient to secure the support component onto the anchoring surface. Preferably, support component 98 comprises up to about 4 horizontal tabs, with up to about 2 horizontal tabs more preferred.

Each of front and back portions 100, 102 of support component 98 also comprises a series of sets of vertical tabs comprising sets 110, 112, 114, wherein each set comprises a first vertical tab on front portion 100 in direct alignment with a second vertical tab (not shown) on back portion 102. The number of series of sets of vertical tabs may vary widely, wherein the number is determined based on the structural limitations of the support component in combination with the desired adaptability of the support component to variously dimensioned anchoring surfaces. For example, where the support component is to be positioned crosswise to bridge the space between two typical ceiling rafters, and wherein such ceiling rafters are typically spaced about 16 inches and about 24 inches apart from each other, then the structural component preferably comprises three series of vertical tab sets, wherein the first and second series (e.g., 110, 112) are spaced to accommodate the 16 inch space between the rafters, and wherein the first and third series (e.g., 110, 114) is spaced to accommodate the 24 inch space between the rafters.

Although the spacing between sets of vertical tabs 110, 112, 114 may vary widely depending on the dimensions of the anchoring surface, preferably, the spacing between individual vertical tabs 110 and 112 is about 15.5 inches to about 16.5 inches, and the spacing between individual vertical tabs 110 and 114 is about 23.5 inches to about 24.5 inches, wherein measurements are made based from the center points of respective individual vertical tabs forming sets 110, 112, 114. As previously stated, these dimensions allow support component 98 to bridge the gap between standard basement and attic ceiling rafters wherein such individual rafters are typically spaced either about 16 inches or about 24 inches apart from each other.

Figure 2:
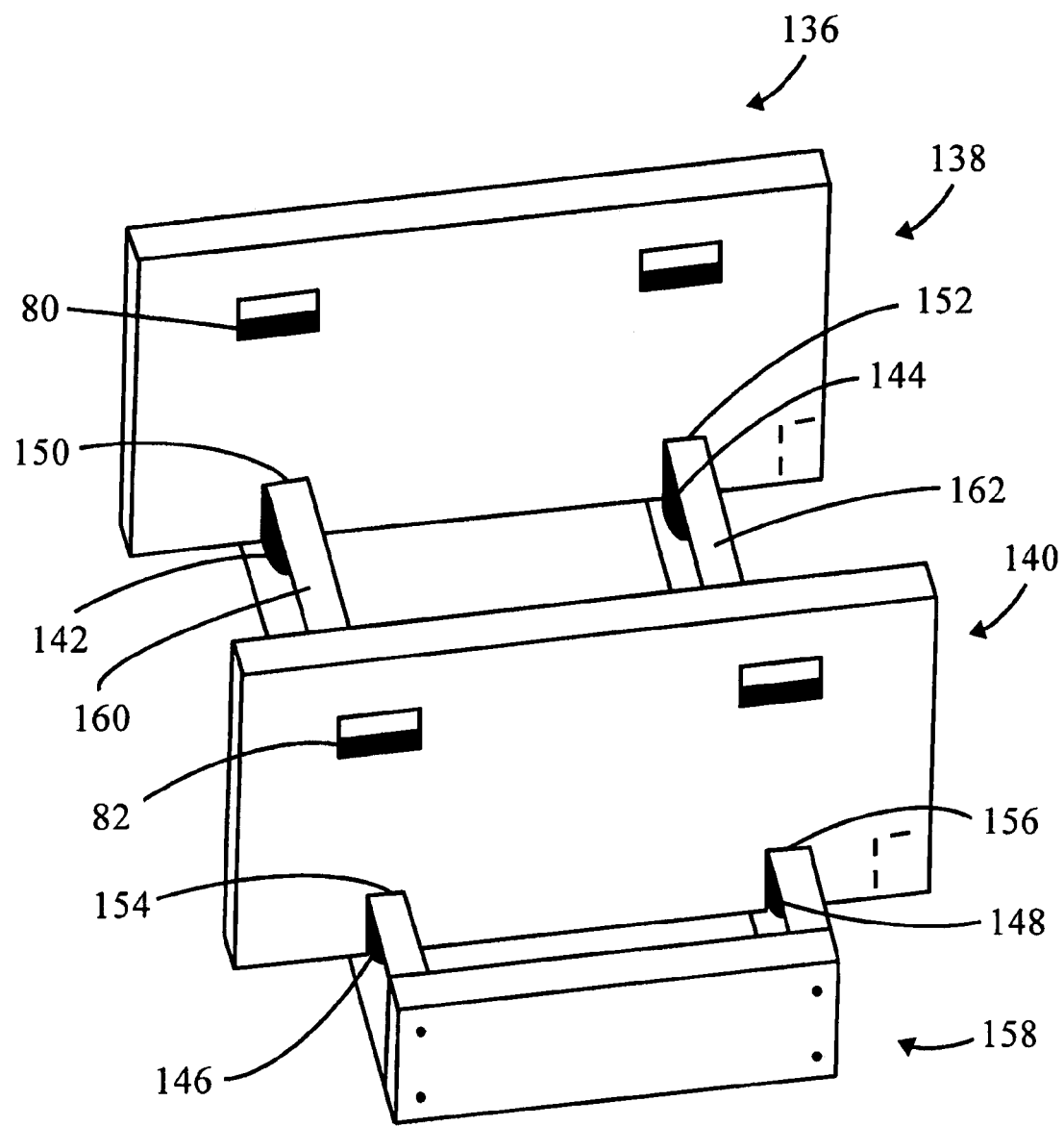
FIG. 2 is a schematic of an exemplary grounded holding device positioned crosswise on an anchoring surface.

Any one or all of the vertical tabs forming sets 110, 112, 114 may be in a closed (as shown) or opened position, wherein when opened, the vertical tabs are preferably opened in an outward direction (as shown by arrows). When the vertical tabs are in the opened position, the support component(s) of the grounded holding device is able to rest on the anchoring surface as shown in FIG. 2. Here, a grounded holding device 136 comprises support components 138, 140 each comprising vertical sets 142, 144, 146, 148 respectively. Each vertical tab forming sets 142, 144, 146, 148 is opened and provides an upper limit 150, 152, 154, 156 respectively. Each support component 138, 140 may be inserted over an anchoring surface 158 such that upper limits 150, 154 are disposed on a rafter 160, and upper limits 152, 156 are disposed on a rafter 162. Upper limits 150, 152, 154, 156 serve to create a block such that rafters 160, 162 do not extend beyond respective upper limits 150, 152, 154, 156. Nails, screws, nuts, bolts, adhesives, and other hardware (not shown) may be used to further secure grounded holding device 136 onto anchoring surface 158, wherein the hardware may fix the vertical tabs to the anchoring surface. Where applicable, the hardware described directly above may be fastened onto the anchoring surface by means of plurality of vias 113 as described in reference to FIG. 1.

It is noted herein that although support components depicted in FIGS. 1–4 have both horizontal and vertical tabs, it is contemplated that an exemplary support component may comprise only one of either the horizontal or vertical tabs as disclosed herein.

Figure 3:
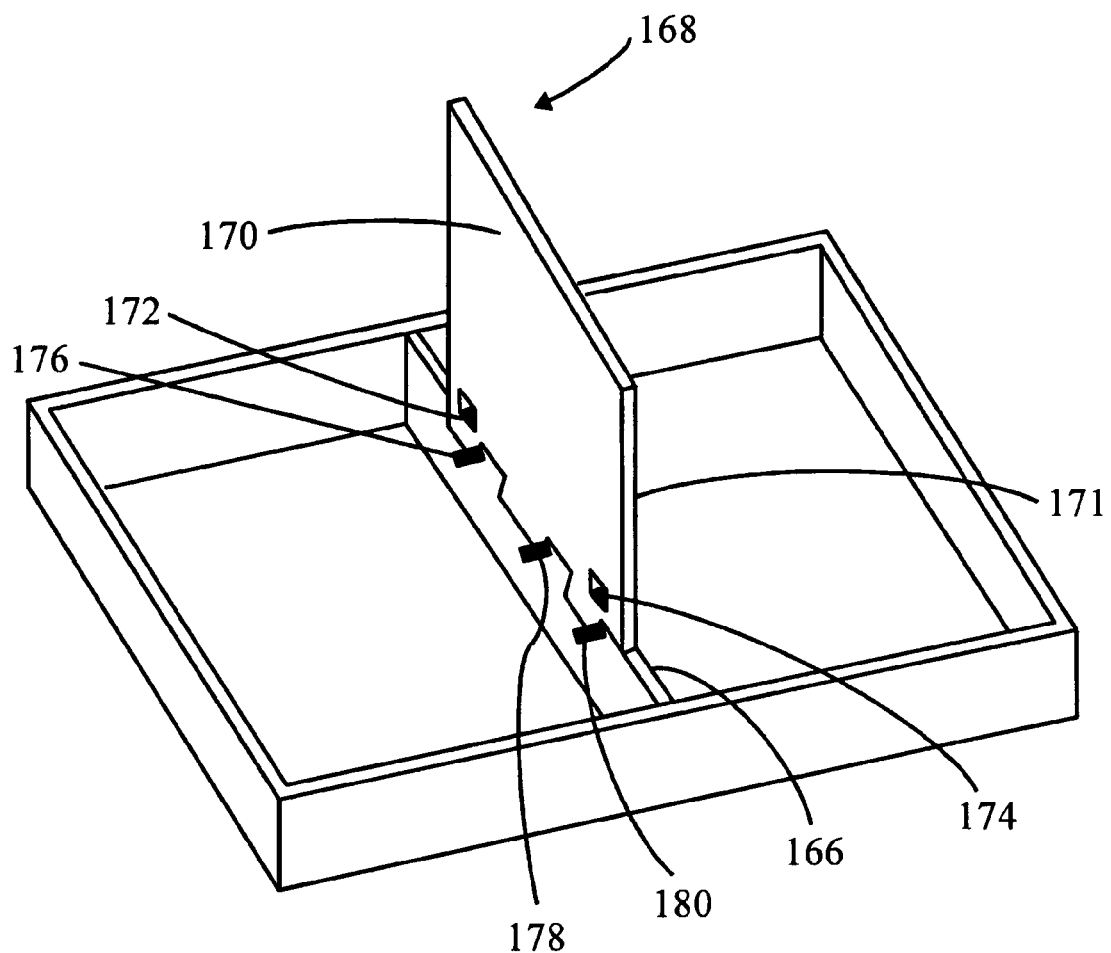
FIG. 3 is a schematic of an exemplary support component positioned lengthwise along an anchoring surface.

FIG. 3 depicts another exemplary positioning of a support component 168. Here a support component 168 comprises a front portion 170 and a back portion 171, wherein front and back portion 170, 171 are joined to each other by means of horizontal tabs 172, 174. Horizontal tabs 172, 174 form an upper limit which defines the boundary above which anchoring surface 166 cannot extend, and allows for the balanced placement of support component 168 onto anchoring surface 166. Although vertical tab sets 176, 178, 180 comprise vertical tabs shown in an open position, they may be closed. Additionally, the vertical tabs may be secured to the anchoring surface by means of hardware such as nails, screws, nuts, bolts, adhesives, and the like, or the sets may be omitted all together. Generally, in any embodiment where the vertical tabs are secured to the anchoring surface by means of hardware, it is contemplated that the vertical tabs will rest against the corresponding surface of the anchoring surface and be secured thereto by means of the hardware. Therefore, the vertical tabs may comprise vias, screw holes, nail holes, or other adaptations to facilitate the use of hardware.

Figure 4:
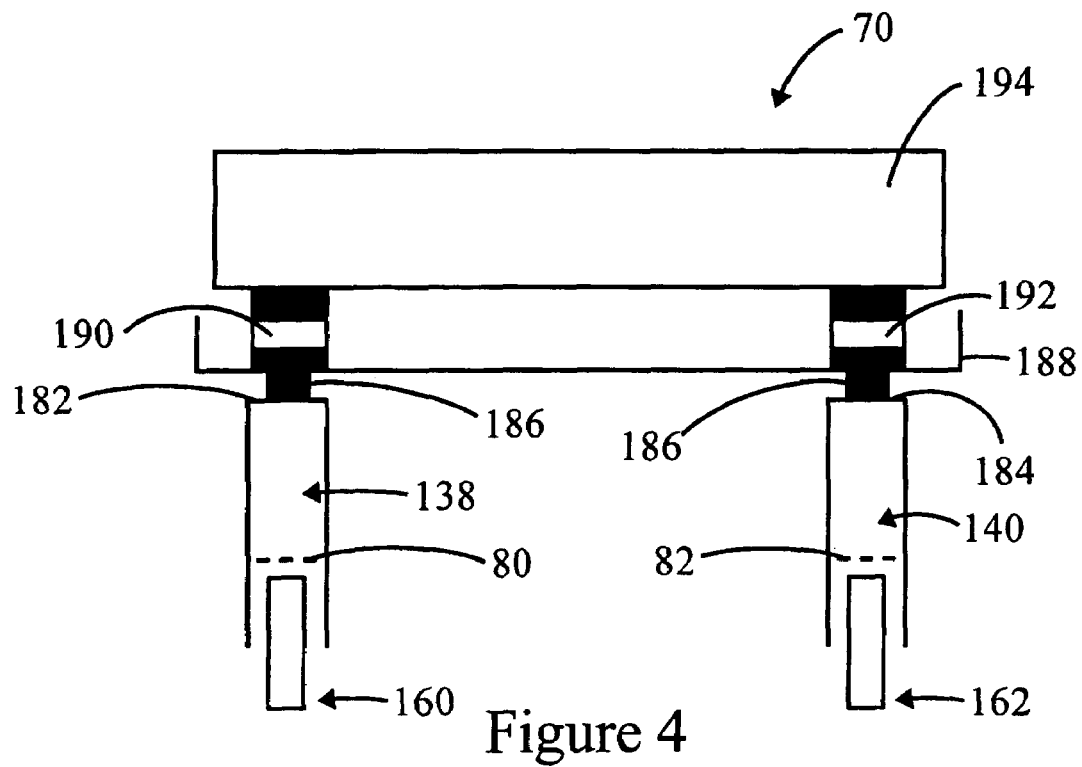
FIG. 4 is a schematic of a side-view of an exemplary grounded holding device positioned lengthwise along an anchoring surface.

FIG. 4 depicts a side view of an exemplary grounded holding device 70 comprising two support components as described in FIG. 2 each arranged lengthwise along an anchoring surface (as described in FIG. 3). Here support components 138, 140 are secured onto respective rafters 160, 162 by means of horizontal tabs 80, 82. Grounded holding device 70 further comprises an adhesive 186 disposed between top surfaces 182, 184 of support components 138, 140 respectively and a pan 188. Buffer elements 190, 192 comprising a double sided sticky tape foam may be secured onto pan 188 such that one side of the sticky surface is disposed onto pan 188. A load 194, such as an air conditioning unit, is then secured onto the opposite sticky surface of buffer elements 190, 192.

Figure 5:
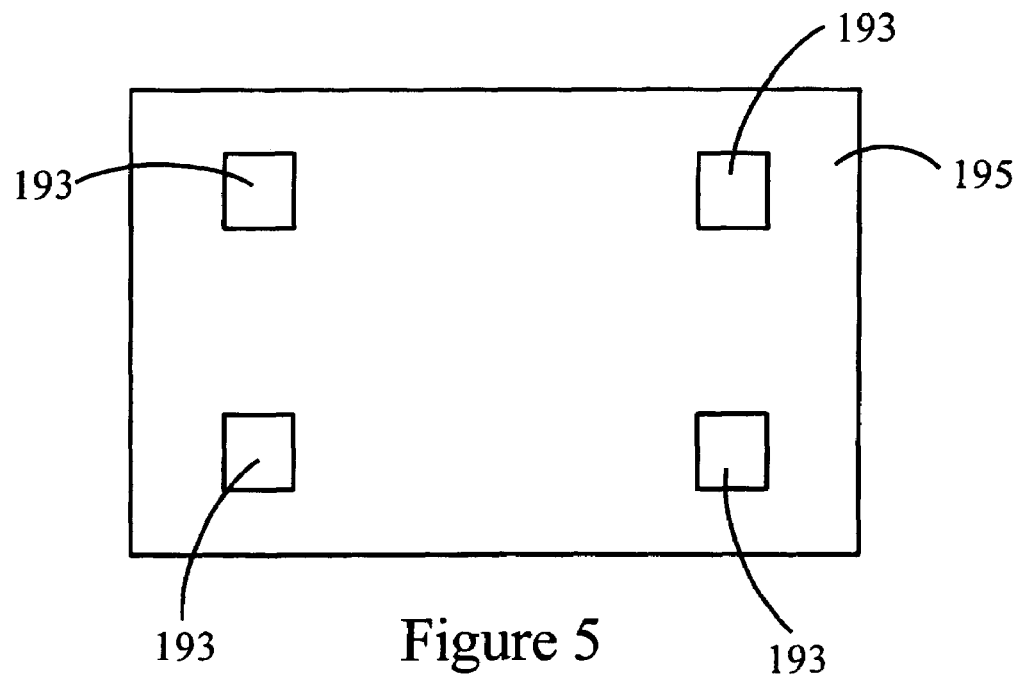
FIG. 5 is a schematic of a top view of an exemplary buffer element arrangement.

Although the number and positioning of buffer elements may vary widely, an exemplary number and positioning is depicted in FIG. 5. Here 4 buffer elements 193 are disposed in a pan 195 to provide adequate structural support. This is a particularly preferred embodiment for grounded holding device 70 depicted in FIG. 4.

The support component(s) depicted in FIGS. 1–4 may comprise a wide variety of sizes and geometrical shapes depending on the size of the anchoring surface. However, referring to FIG. 1 merely for the sake of example, front and back portions 100, 102 preferably comprise a length of about 20 inches to about 40 inches, wherein a length of about 25 inches to about 35 inches is more preferred, and about 28 inches to about 33 inches is even more preferred, and about 32 inches is especially preferred. A lower portion 57 preferably comprises a height of about 1 to about 12 inches, wherein a height of about 2.5 inches to about 9 inches is more preferred, and about 3.0 inches to about 6 inches is even more preferred, with about 3.5 inches especially preferred. An upper portion 59 preferably comprises a height of about 3 inches to about 20 inches, with a height of about 5 inches to about 17 inches more preferred, and a height of about 6.5 inches to about 13 inches even more preferred, with a height of about 8 inches especially preferred. Top surface 104 may comprise a length of about 16 inches to about 36 inches, wherein a length of about 21 inches to about 31 inches is more preferred, and about 24 inches to about 29 inches is even more preferred, and about 28 inches is especially preferred.

Horizontal tabs 115, 116 may each comprise a length of about 1 to about 5 inches, wherein a width of about 1.5 inches to about 4 inches is preferred, and a width of about 2 inches is more preferred. Furthermore, horizontal tabs 115, 116 may comprise a depth of about 0.25 inch to about 1 inch, wherein a depth of about 0.75 inch is preferred. The spacing between horizontal tabs 115, 116 may comprise a distance of about 18 to about 25 inches, wherein a distance of about 20 to about 23 inches is more preferred, and a distance of about 21.875 inches is especially preferred, wherein the distance is based from the ending of horizontal tab 115 to the beginning of horizontal tab 116. Furthermore, horizontal tabs 115, 116 may be positioned about 0.5 inches to about 5 inches inward from the lateral edges of front and back portions 100, 102, wherein a distance of about 0.75 inches is preferred.

Each vertical tab may comprise a width of about 0.75 inch to about 3 inches, wherein a width of about 1 inch to about 2 inches is preferred, and a width of about 1.75 inches is more preferred. Furthermore, sets 110, 112, 114 are preferably about 4 inches to about 8 inches high, wherein a height of about 2.5 inches to about 6 inches is preferred, and a height of about 3.5 inches is more preferred.

The grounded holding device disclosed herein has several advantages over the prior art. For example, a single support component can be configured to conform to a number of variously dimensioned anchoring surfaces, such that the holding device can fit a number of differently sized anchoring surfaces. Furthermore, the grounded holding device eliminates the need for accessory parts as are commonly required when installing heavy loads, such as air conditioning units. Also, the grounded holding device can be adapted to rest parallel to, or perpendicular to, the anchoring surface, thereby further facilitating the ease of installation. Also, each support component disclosed herein can support a load of up to about 500 pounds, such that heavy loads may be adequately supported by the holding device.

While preferred embodiments have been shown and described, various modifications and substitutions may be made thereto without departing from the spirit and scope of the invention. Accordingly, it is to be understood that the present invention has been described by way of illustrations and not limitation.

What is claimed is:

1. A support component for supporting a load comprising:
   a front portion having a top side;
   a back portion having a top side;
   a top surface joining at least a portion of the top sides of the front and back portions;
   an adhesive disposed on the tope surface; and
   a securing element, wherein the securing element comprises at least one horizontal tab and a first set of vertical tabs; wherein:
   the horizontal tab(s) extends through a space formed between the front and back portions to form a bridge between the front and back portions, wherein the horizontal tab(s) creates an upper limit for placement of the support component lengthwise onto an anchoring surface; and
   the first set of vertical tabs comprises a first vertical tab disposed on the front portion and a second vertical tab disposed on the back portion, wherein the first and second vertical tabs are in direct alignment with each other, and further wherein the first and second vertical tabs each creates an upper limit for placement of the support component crosswise onto the anchoring surface.

2. A support component for supporting a load comprising:
   a front portion having a top side;
   a back portion having a top side;
   a top surface joining at least a portion of the top sides or the front and back portions; and
   a securing element, wherein the securing element comprises:
   at least one horizontal tab wherein the horizontal tab(s) extends through a space formed between the front and back portions to form a bridge between the front and back portions, and further wherein the horizontal tab(s) creates an upper limit for placement of the support component lengthwise onto an anchoring surface; and
   a first set of vertical tabs comprising a first vertical tab disposed on the front portion and a second vertical tab disposed on the back portion, wherein the first and second vertical tabs are in direct alignment with each other, and further wherein the first and second vertical tabs each creates an upper limit for placement of the support component crosswise onto the anchoring surface;
   a second set of vertical tabs comprising a third vertical tab disposed on the front surface and a fourth vertical tab disposed on the back surface, wherein the third and fourth vertical tabs are in direct alignment with each other, and further wherein the third and fourth vertical tabs each creates an upper limit for placement of the first support component crosswise upon the anchoring surface; and a third set of vertical tabs comprising a fifth vertical tab disposed on the front surface and a sixth vertical tab disposed on the back surface, wherein the fifth and sixth vertical tabs are in direct alignment with each other, and further wherein the fifth and sixth vertical tabs each creates an upper limit for placement of the first support component crosswise upon the anchoring surface.

3. The support component of claim 2, wherein a distance between the first set of vertical tabs and the second set of vertical tabs is about 15.5 inches to about 16.5 inches, and a distance between the first set of vertical tabs and the third set of vertical tabs is about 23.5 inches to about 24.5 inches.

4. A grounded holding device comprising:

an anchoring surface;

a first support component and a second support component, wherein the first and second support components are aligned with each other on the anchoring surface, and wherein each comprises:
a front portion having a top side;
a back portion having a top side;
a top surface joining at least a portion of the top sides of the front and back portions; and a securing element, wherein the securing element comprises:
at least one horizontal tab wherein the horizontal tab(s) extends through a space formed between the front and back portions to form a bridge between the front and back portions, wherein the horizontal tab(s) creates an upper limit that abuts the anchoring surface when the respective first and second support component is disposed over the anchoring surface in a lengthwise fashion;
a first set of vertical tabs comprising a first vertical tab disposed on the front portion and a second vertical tab disposed on the back portion, wherein the first and second vertical tabs are in direct alignment with each other, and further wherein the first and second vertical tabs each creates an upper limit that abuts the anchoring surface when the respective first and second support component is disposed over the anchoring surface in a crosswise fashion;
a second set of vertical tabs comprising a third vertical tab disposed on the front surface and a fourth vertical tab disposed on the back surface, wherein the third and fourth vertical tabs are in direct alignment with each other, and further wherein the third and fourth vertical tabs each comprises an upper limit that abuts the anchoring surface when the respective first and second support component is disposed over the anchoring surface in a crosswise fashion; and
a third set of vertical tabs comprising a fifth vertical tab disposed on the front surface and a sixth vertical tab disposed on the back surface, wherein the fifth and sixth vertical tabs are in direct alignment with each other, and further wherein the fifth and sixth vertical tabs each comprises an upper limit that abuts the anchoring surface when the respective first and second support component is disposed over the anchoring surface in a crosswise fashion.

5. The support component of claim 4, wherein the anchoring surface further comprises a first member opposite to a second member, and wherein:
the upper limits of the first and second vertical tabs of the first support component abut the first member;
either the upper limits of the third and fourth vertical components or the upper limits of the fifth and sixth vertical components of the first support component abut the second member;
the upper limits of the first and second vertical tabs of the second support component abut the first member; and
either the upper limits of the third and fourth vertical components or the upper limits of the fifth and sixth vertical components of the second support component abut the second member.

6. A grounded holding device comprising:

an anchoring surface;

a first support component and a second support component, wherein the first and second support components are aligned with each other on the anchoring surface, and wherein each comprises:
a front portion having a top side;
a back portion having a top side;
a top surface joining at least a portion of the top sides of the front and back portions;

a pan disposed on the top surfaces of the first and second support components; and a securing element, wherein the securing element comprises at least one horizontal tab and a first set of vertical tabs, wherein:
the horizontal tab(s) extends through a space formed between the front and back portions to form a bridge between the front and back portions, wherein the horizontal tab(s) creates an upper limit that abuts the anchoring surface when the respective first and second support component is disposed over the anchoring surface in a lengthwise fashion; and
the first set of vertical tabs comprises a first vertical tab disposed on the front portion and a second vertical tab disposed on the back portion, wherein the first and second vertical tabs are in direct alignment with each other, and further wherein the first and second vertical tabs each creates all upper limit that abuts the anchoring surface when the respective first and second support component is disposed over the anchoring surface in a crosswise fashion.

7. The grounded holding device of claim 6, further comprising a first adhesive disposed between the pan and the top surface of the first support component and a second adhesive disposed between the pan and the top surface of the second support component.

8. The grounded holding device of claim 6, further comprising a first buffer element disposed on a surface of the pan opposite to the top surface of the first component, and a second buffer element disposed on a surface of the pan opposite to the top surface of the second component.

9. A grounded holding device comprising:

an anchoring surface, wherein the anchoring surface comprises a rafter or a beam;

a first support component and a second support component, wherein the first and second support components are aligned with each other on the anchoring surface, and wherein each comprises:
a front portion having a top side;
a back portion having a top side;
a top surface joining at least a portion of the top sides of the front and back portions; and a securing element, wherein the securing element comprises at least one horizontal tab and a first set of vertical tabs, wherein:
- the horizontal tab(s) extends through a space formed between the front and back portions to form a bridge between the front and back portions, wherein the horizontal tab(s) creates an upper limit that abuts the anchoring surface wherein the respective first and second support component is disposed over the anchoring surface in a lengthwise fashion; and
- the first set of vertical tabs comprises a first vertical tab disposed on the front portion and a second vertical tab disposed on the back portion, wherein the first and second vertical tabs are in direct alignment with each other, and further wherein the first and second vertical tabs each creates an upper limit that abuts the anchoring surface when the respective first and second support component is disposed over the anchoring surface in a crosswise fashion.

10. A support component for supporting a load comprising:
- a front portion having a top side;
- a back portion having a top side;
- a top surface joining at least a portion of the top sides of the front and back portions; and
- a securing element, wherein the securing element comprises at least one horizontal tab and a first set of vertical tabs; wherein:
  - the horizontal tab(s) extends through a space formed between the front and back portions to form a bridge between the front and back potions, wherein the horizontal tab(s) creates an upper limit for placement of the support component lengthwise onto an anchoring surface; and
  - the first set of vertical tabs comprises a first vertical tab disposed on the front portion and a second vertical tab disposed on the back portion, wherein the first and second vertical tabs are in direct alignment with each other, and further wherein the first and second vertical tabs each creates an upper limit for placement of the support component crosswise onto the anchoring surface;
- wherein the upper limit(s) of the horizontal tab(s) and the upper limits of the first vertical tab and the second vertical tab lie along a same longitudinal axis of the support component.

* * * * *